US005267318A

United States Patent [19]

Severson et al.

[11] Patent Number: 5,267,318

[45] Date of Patent: Nov. 30, 1993

[54] MODEL RAILROAD CATTLE CAR SOUND EFFECTS

[76] Inventors: Frederick E. Severson, 945 SW. Perfecta Ave., Beaverton, Oreg. 97005; Patrick A. Quinn, 20195 SW. Imperial Dr., Aloha, Oreg. 97007

[21] Appl. No.: 588,566

[22] Filed: Sep. 26, 1990

[51] Int. Cl.[5] .......... G10L 5/02; G11B 17/22; A63H 30/00

[52] U.S. Cl. .......... 381/51; 369/31; 369/63; 446/175; 446/409; 200/61.45 R; 340/384 E

[58] Field of Search .......... 381/51-53, 381/46; 446/175, 295, 408, 409, 297, 303; 340/825.69, 825.72, 825.76, 384 E; 200/61.45 R; 369/31, 63; 472/98

[56] References Cited

U.S. PATENT DOCUMENTS

| | | | |
|---|---|---|---|
| 4,124,841 | 11/1978 | Kettunen | 200/61.45 R |
| 4,221,927 | 9/1980 | Dankman et al. | 381/46 |
| 4,267,551 | 5/1981 | Dankman et al. | 446/295 |
| 4,289,307 | 9/1981 | Marshall, Jr. et al. | 472/98 |
| 4,857,030 | 8/1989 | Rose | 381/51 |

*Primary Examiner*—Dale M. Shaw
*Assistant Examiner*—Kee M. Tung
*Attorney, Agent, or Firm*—Marger, Johnson, McCollom & Stolowitz

[57] ABSTRACT

A model railroad cattle car sound effects system includes a speech synthesis circuit (FIG. 6) for "playing" selected cow voices stored as digital data in an EPROM (160). In a random mode of operation, a state generator (30) provides a pseudo-random count that is used to select among four different calm cow voices, one of which is silence. The resulting audio output is perceived as random contented cow sounds. A pendulum motion detector (FIG. 8) provides an indication of lateral motion of the system. An up/down motion counter (40) maintains a motion count reflecting the level of excitation of the system (and the cows). The motion counter increments responsive to motion, and decrements gradually in the absence of detected motion. A motion count of at least four invokes a triggered mode of operation, in which the counter output is used to select among four different excited cow voices. The resulting audio output imitates increasingly agitated cows as the motion count further increases.

23 Claims, 10 Drawing Sheets

MODEL RAILROAD CATTLE CAR SOUND EFFECTS

BACKGROUND OF THE INVENTION

The present invention relates to the field of toys that generate sounds electronically. More particularly, it includes methods and apparatus for generating sound effects in toys that vary in response to external stimuli, such as motion of the toy, in an intelligent way. The resulting sound effects are interesting, unpredictable and, therefore, fun.

For example, it is known in the model railroading industry to simulate the sounds made by various animals, such as cows, in connection with the operation of model railroad cattle cars. "Mooing" sounds, for example, generated by or in connection with a stock car enhance the fun, interest and realism of a model railroad layout. Typically, such sound effects are. either on (being generated) or off (not generated) under the control, for example, of a manual switch.

"Mooing", however, or other animal sounds generated in the conventional manner, lose their novelty after repeated use. Indeed, monotonous overuse of such sounds can be annoying to a listener. The present invention is directed to far more intelligent and interesting effects, including animal sound effects, for use in model railroading or in any of a wide variety of toys such as toy dolls, animals or the like.

SUMMARY OF THE INVENTION

One object of the present invention is to automatically provide varied and interesting effects, such as sound effects, for use in model railroad equipment, toys and the like.

Another object is to vary simulated sound, such as sound effects, in response to an external stimulus, such as heat, light, motion or the like to make the simulation realistic, appropriate or amusing.

A further object is to provide a plurality of different sound effects and automatically switch among the various sound effects in response to stimulation in a realistic manner.

Yet another object is to vary the timing or frequency of generated sounds as well as select among various sounds or "voices" in response to stimulation, to realistically simulate the sounds that would be made by real animals in response to the same stimulation.

A further object is to marry sound synthesis and motion detection together to provide fun, funny and realistic model railroading for a hobbyist's enjoyment.

One aspect of the invention is a sound effect system for use in a toy such as a doll, stuffed animal or model railroad car. The system includes a clock for providing a system clock signal. A random state generator is coupled to the clock for providing a random count. The random count changes in response to each cycle of the system clock signal. A true random number generator would be an ideal state generator. As a more economical alternative, a shift register is arranged as a state machine to provide a sequence of 32 counts. This is sufficient to provide pseudo-random counts.

A sound generating apparatus is provided for generating a selected one at a time of a plurality of predetermined audible voices. Each of the voices corresponds to a respective voice selection number. The sound generating apparatus is coupled to receive the random count as the voice selection number, so that the selected voice changes in response to the system clock signal, thereby generating voices in a seemingly random (pseudo-random) sequence.

Another aspect of the invention includes automatically connecting a battery to power up the system in response to detecting a stimulus. To do so requires a detector for providing a stimulus detect signal and a circuit responsive to the stimulus detect signal for connecting the battery to the system.

The stimulus may be any desired condition, parameter or action. Examples include heat, light and motion. In the preferred embodiment, the chosen stimulus is lateral motion and the stimulus detect signal therefore is a motion detect signal (DET). A lateral motion detector apparatus is disclosed.

Yet another aspect of the invention is to keep the battery connected, and therefore the system powered, for a time after the stimulus is no longer detected. For example, after a real cattle car has stopped moving (motion stimulus), the cows are likely to continue mooing for awhile. Accordingly, the invention includes a timer for providing a predetermined time interval, coupled to the motion detector so that the time interval starts in response to detected motion. Circuitry for disconnecting the battery responsive to a conclusion of the time interval is disclosed. The timer is reset to restart the time interval whenever a new stimulus detect signal occurs.

Certain of the random states or counts are designated to be silent states. To implement this feature, circuitry is provided for detecting and indicating occurrence of the designated count, and for silencing the sound generating apparatus in response to such an indication. The effect is to silence the sound effects seemingly at random to make the effects more realistic.

The sound generating apparatus includes a memory, such as an EPROM, for storing digital data representing each of the voices. A speech synthesis circuit is coupled to the memory to receive the stored data for synthesizing the voices in accordance with the stored data.

In an example of an operative embodiment, the speech synthesis system creates a table in the memory containing start and end addresses for each voice. Therefore, only a few voice selection bits are required to select any particular voice.

The motion detector provides a detect signal indicating an occurrence of the stimulus, for example, lateral motion. The detect signal and the system clock signal are combined, so that each pulse of either the detect signal or the system clock signal triggers the state generator to change the random count. Accordingly, the random count changes at least every system clock cycle, and additionally changes in response to each occurrence of the stimulus.

Another aspect of the invention includes a motion counter for generating a motion count indicating a state of excitation of the system. The motion counter is incremented in response to the motion detect signal. It is decremented responsive to each system clock signal pulse in the absence of a detect signal. In this way, the state of excitation (motion count) gradually increases responsive to repeated motion detect signals, and gradually decreases over time in the absence of detect signals.

The motion counter of course has a limited number of possible states (generally corresponding to the number of cow voices). The motion counter counts down to 000, and then is reset to 001. Accordingly, the counter loops between 001 and 000 responsive to continued decrementing.

Motion detect pulses switch the motion counter to UP mode. After reaching an upper count limit, 111, the counter is reset to a lower number, for example 101. The counter thus loops from 111 to 101 in the up mode.

Preferably, the counter is implemented using a parallel load up/down integrated circuit counter. However, it may be advantageous to implement the invention using a microprocessor, for example, the 8080 part available from Intel Corporation. A microprocessor implementation could be used to obviate almost all of the counters and random logic. A microprocessor system would comprise the microprocessor IC, the speech synthesizer IC, the EPROM, and perhaps an audio amplifier to drive the speaker.

The voice selection employs two modes, random and triggered. Random mode is when the motion count is less than a predetermined number called the trigger count, equal to 4 in the preferred embodiment. Random mode exists when little or no lateral motion is detected. Accordingly, the speech apparatus generates quiet, contented random cow sounds.

When the motion count equals or exceeds the trigger count, the apparatus is in triggered mode. Two sets of cow voices are used, one set of voices during random mode and the other during triggered mode. The latter set of cow voices are progressively more agitated.

The mode controls a selector circuit so as to couple the random count to the sound apparatus as voice selection data when random mode is indicated. When triggered mode is indicated, the selector couples the motion count to the sound apparatus as the voice selection data.

Other forms of response may be used instead of speech synthesis. For example, the state of the system may be displayed visually. Examples of visual output include a meter indicating the level of excitation (motion count), or perhaps a display of lights such as light emitting diodes, in which each light corresponds to a respective level of excitation.

A further aspect of the invention is a lateral motion detector apparatus. The motion detector includes an elongated electrically conductive pendulum suspended above a circuit board so that the pendulum extends through an aperture provided in the board. The aperture is sized to clear the pendulum, so it does not contact the board at rest. When lateral force is applied to the apparatus, the pendulum swings so that it contacts the periphery of the aperture, which is also electrically conductive, thereby closing the switch.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Overview

Figure 1:
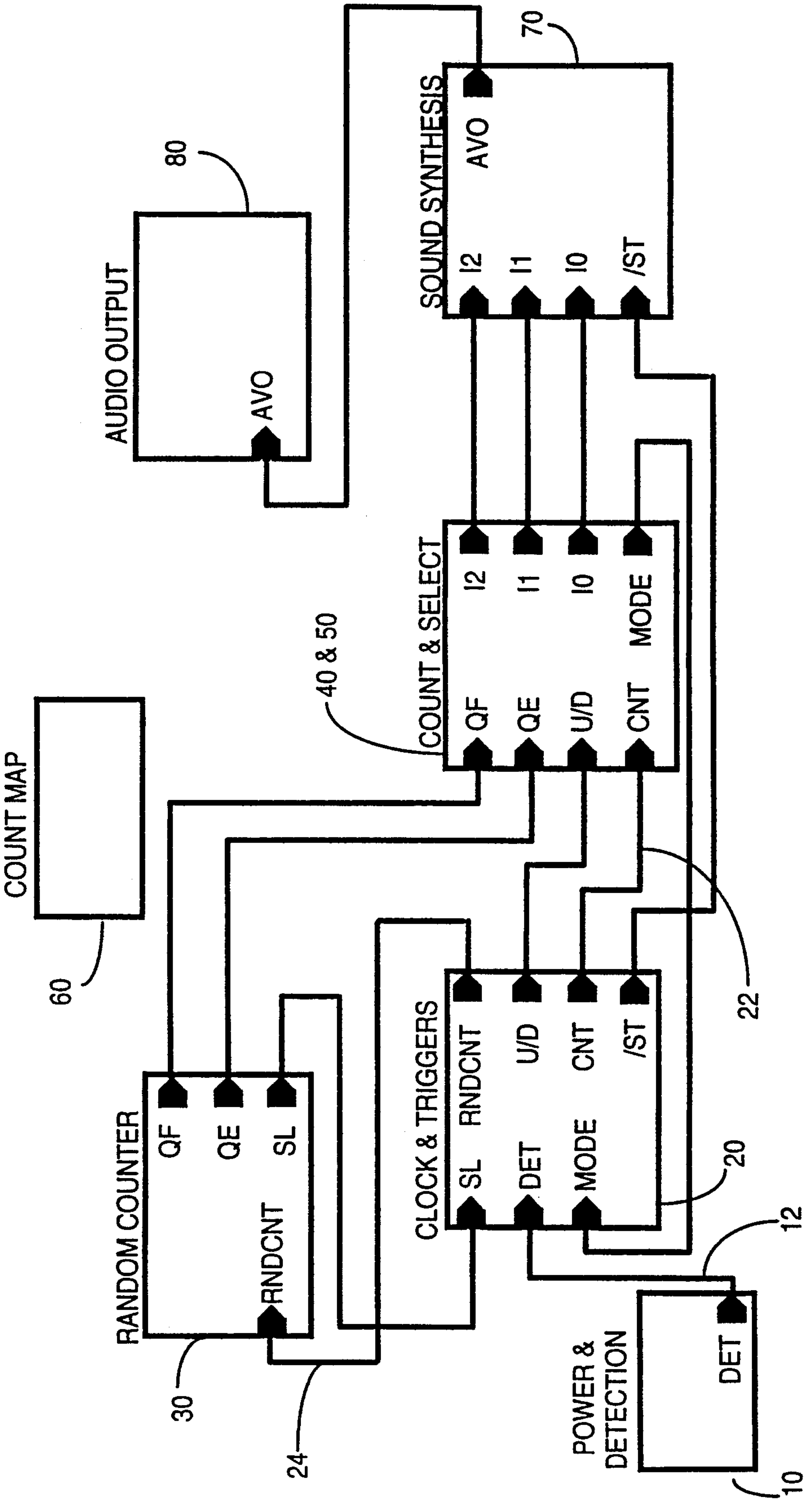
FIG. 1 is a block diagram of a sound effects system according to the present invention.

Power and Detection circuitry 10 includes a regulated battery power supply with automatic power-up and battery time-out features. It also includes a motion detector, and generates a signal DET in response to detected motion.

Clocks and Triggers circuitry 20 includes a system clock that generates a system clock signal CLK. Logic combines the DET and CLK signals to provide a CNT signal for clocking a motion counter and a RNDCLK signal for clocking a random counter. Trigger circuitry also provides a speech trigger signal /ST to trigger speech synthesis and an up/down mode signal U/D for controlling the motion counter.

Random Counter circuitry 30 includes a pseudo-random counter that provides bits QE, QF which form part of a voice selection number used to select voices in the random mode of operation. Another signal SL is provided to silence the speech synthesis at pseudo-random times.

Count and Select circuitry 40,50 includes the motion counter. Select circuitry couples either the random counter bits QE,QF (in random mode) or the motion counter output bits (in triggered mode) to outputs I0,I1 as voice selection bits.

Sound Synthesis circuitry 70 selects the voice indicated by the voice selection bits, and generates the corresponding audio output signal AVO in response to each /ST trigger signal. Audio Output circuitry 80 filters and amplifies the audio output signal to drive a speaker.

Figure 2:
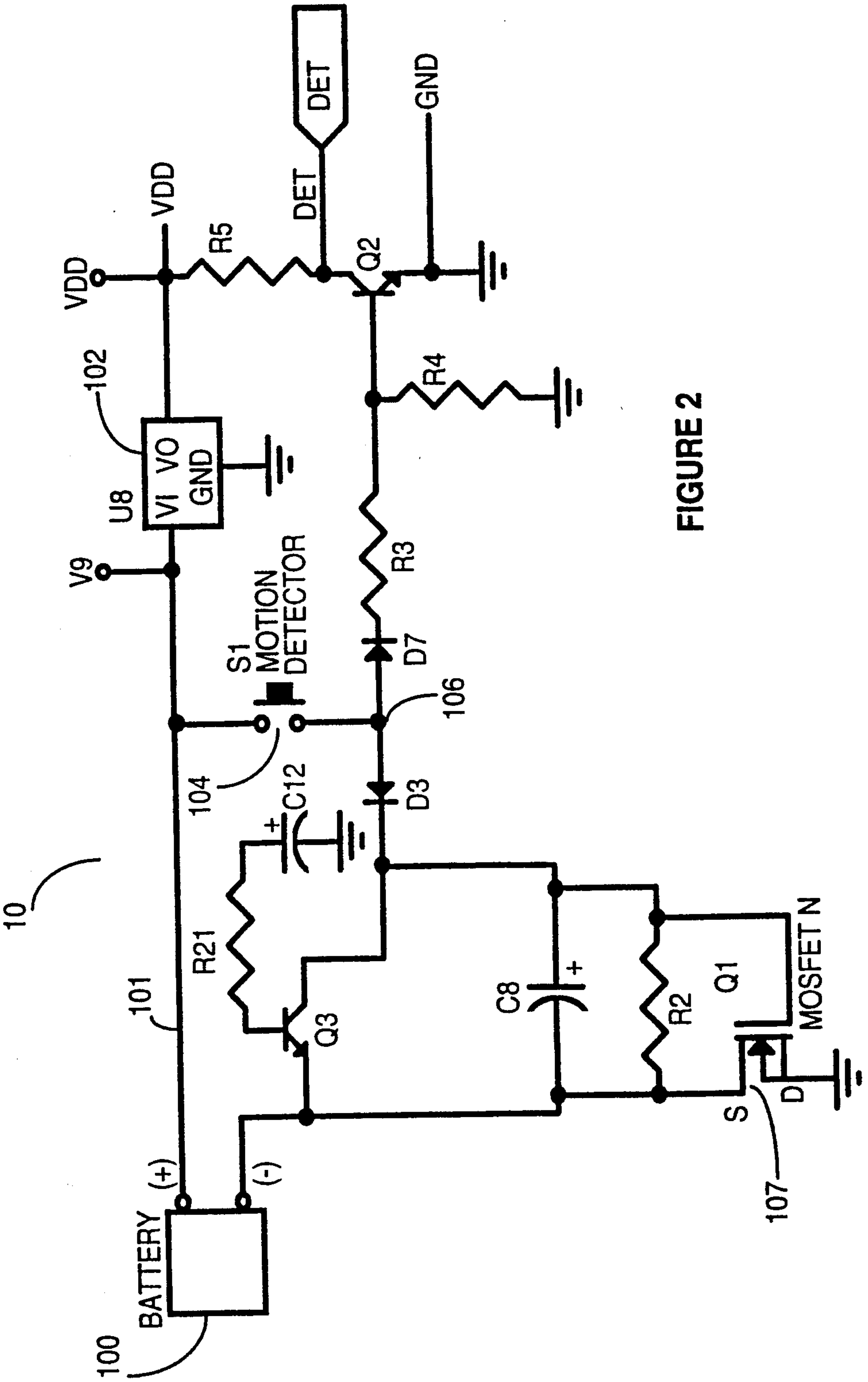
FIGS. 2-3, 4A, 4B, 5, 6A, 6B, and 7 are schematic diagrams of various parts of the sound effects system of FIG. 1.

Referring now to FIG. 2, the power and detection circuitry 10 includes automatic power-up, battery timeout functions, motion detect, and power supply functions, all described in greater detail as follows. A battery 100 provides a DC voltage source. The battery may be a conventional 9 volt transistor radio battery or a nickel cadmium rechargeable battery, for example, having a nominal 7.2 volts. The battery provides input voltage at node 101 to a three-terminal voltage regulator 102. Regulator 102, in turn, provides a regulated output voltage VDD of 5 volts DC for powering the logic and other circuits described below.

A motion detector 104 is coupled between node 101 and node 106. The motion detector essentially is a normally open switch. The switch momentarily closes in response to lateral motion of the motion detector.

Figure 8:
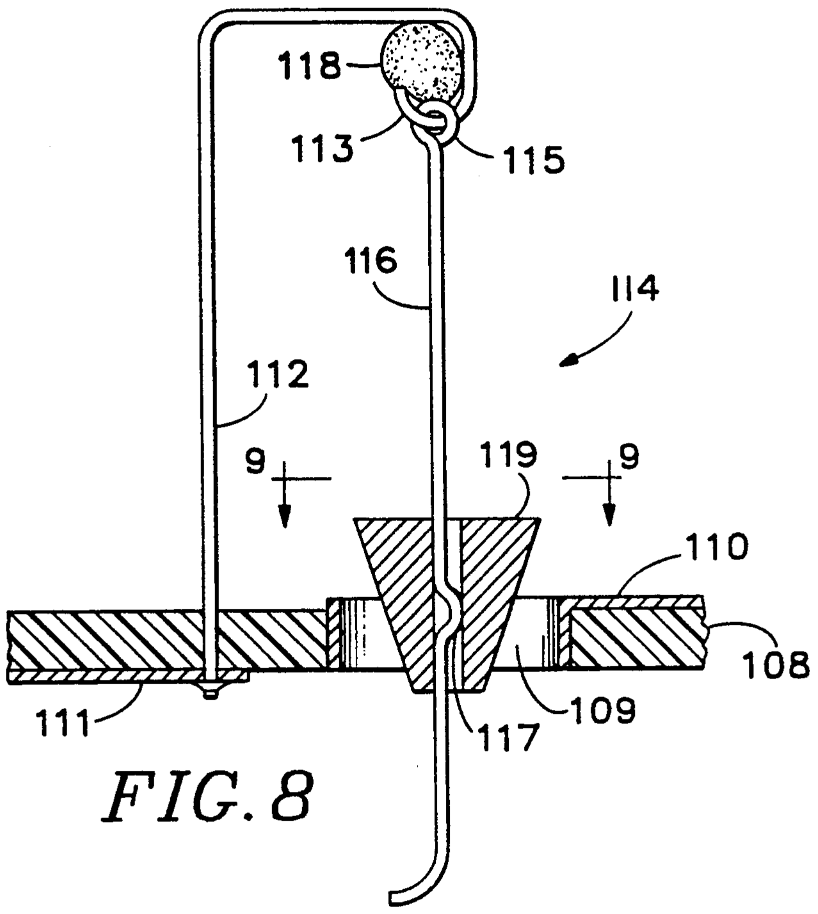
FIGS. 8 and 9 illustrate a lateral motion detector apparatus according to the present invention.

The motion detector 104 is shown in detail in FIG. 8 in cross-section. Referring now to FIG. 8, the motion detector is a normally-open switch, formed as follows.

An elongate, electrically conductive pendulum 114 is formed of a solid wire 116 and includes a truncated cone-shaped conductive weight 119 having a central aperture. Weight 119 preferably is made of brass. It is engaged onto the pendulum wire 116 so that the wire extends through the central aperture. A crimped region 117 of wire 116 is located within the aperture and contacts the interior sidewall of the aperture for holding the weight in a predetermined position along the wire. The top end of wire 116 is bent to form a loop 115 for suspending the pendulum.

A generally horizontal plate, for example a printed circuit board 108, has an aperture 109 extending therethrough. Aperture 109 is sized to clear the weight 119 and includes conductive material, for example metal plating, extending about the periphery of the aperture for contacting the weight to close the switch. The plating about the periphery of aperture 109 is electrically connected to a conductive trace 110 on the board surface. Trace 110 forms one terminal of the normally-open switch.

A rigid wire 112 extends through another aperture in the circuit board 108 and is fixed to the board at its lower end, for example by soldering. Wire 112 is electrically connected at its lower end to a second conductive trace 111 on the board. Trace 111 forms the second terminal of the switch. Wire 112 extends above the board and over aperture 109. The top end of wire 112 is curved to form a depending hook 113. Pendulum 114 is suspended by engaging loop 115 onto hook 113.

The pendulum is aligned over and extends through aperture 109 so as to clear the aperture when the board is at rest and horizontal. Responsive to lateral motion of the detector, the pendulum swings so that weight 119 contacts the periphery of aperture 109, thereby electrically interconnecting traces 110 and 111 to close the switch.

A compressible pad 118 is disposed within hook 113 contacting loop 115 of the pendulum. Pad 118 prevents the loop 115 from disengaging from hook 113, maintains wire 112 and pendulum 114 in electrical contact, and dampens motion of the pendulum to reduce bouncing.

Clearance between weight 117 and the periphery of aperture 109 can be adjusted by sliding the weight along wire 116, so long as the crimped region 117 of wire 116 remains within the weight to hold it in place. Adjusting the clearance changes the sensitivity of the motion detector.

Figure 9:
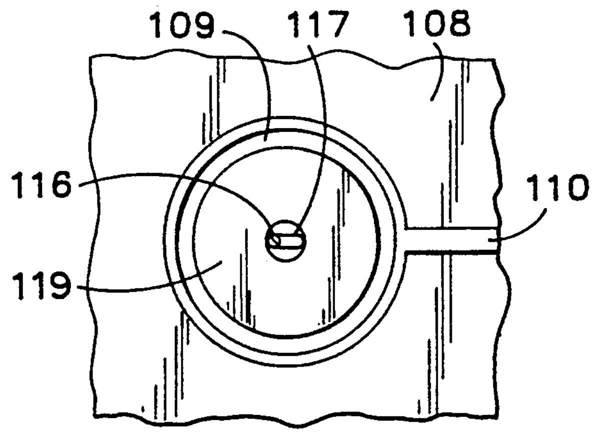

The motion detector described has "memory" in that, once an initial lateral force starts the pendulum swinging, even though it may not contact the plating initially, the pendulum is likely to contact the plating in response to a relatively small second lateral force, depending upon the timing, as the pendulum may be swinging close to the aperture edge when the second force is imparted. FIG. 9 is a top view of the motion detector of FIG. 8, taken along line 9—9 of FIG. 8.

Automatic power-up is provided as follows. A MOSFET transistor 107 has a gate terminal coupled to the cathode of diode D3. The source of MOSFET 107 is connected to the negative side of battery 100 and the drain terminal of MOSFET 107 is coupled to ground. A capacitor C8 and a resistor R2 are connected in parallel between the gate and source terminals. When the motion detector switch 104 closes, the battery forward biases diodes D2 and D3 and charges capacitor C8. The gate node thus rises to the battery voltage minus two diode drops, turning the MOSFET ON. This connects the negative battery terminal to ground through the MOSFET, thereby completing the battery circuit to power the remaining circuitry. The entire sound effect system thus is powered up in response to a detected motion.

Battery time-out is provided as follows. While the motion detector switch is open, capacitor C8 gradually discharges through resistor R2. These components are selected to have a long time constant. For example, with capacitor C8 equal to 100 microfarads and resistor R2 equal to 10 Megohms, the time constant is on the order of 1,000 seconds or about 17 minutes. Accordingly, once the circuit is turned on, if no subsequent motions are detected, the MOSFET is turned off after about 15 minutes, thereby disconnecting the battery from the remainder of the circuitry. On the other hand, at any time a motion is detected, capacitor C8 is recharged, thereby essentially resetting the 15 minute battery timer. To summarize, this circuitry will keep the power on for as long as motions are being detected and for about 15 minutes after the last motion is detected.

A motion detect signal (DET) is provided as follows. A transistor Q2 has a collector terminal pulled up to VDD through resistor R5, an emitter terminal coupled to ground and a base terminal biased to ground through resistor R4. Accordingly, transistor Q2 is normally off. When a motion is detected, switch 104 closes and diode D7 turns on, pulling up the base of Q2 through resistor R3 to turn the transistor ON. When the transistor turns on, the collector terminal goes low. The collector terminal provides the motion detect signal called DET. DET is normally high and provides a low pulse every time motion detect switch 104 bounces. Other details of the circuitry of FIG. 2 will be apparent to those skilled in the art, so further explanation is unnecessary.

Figure 3:
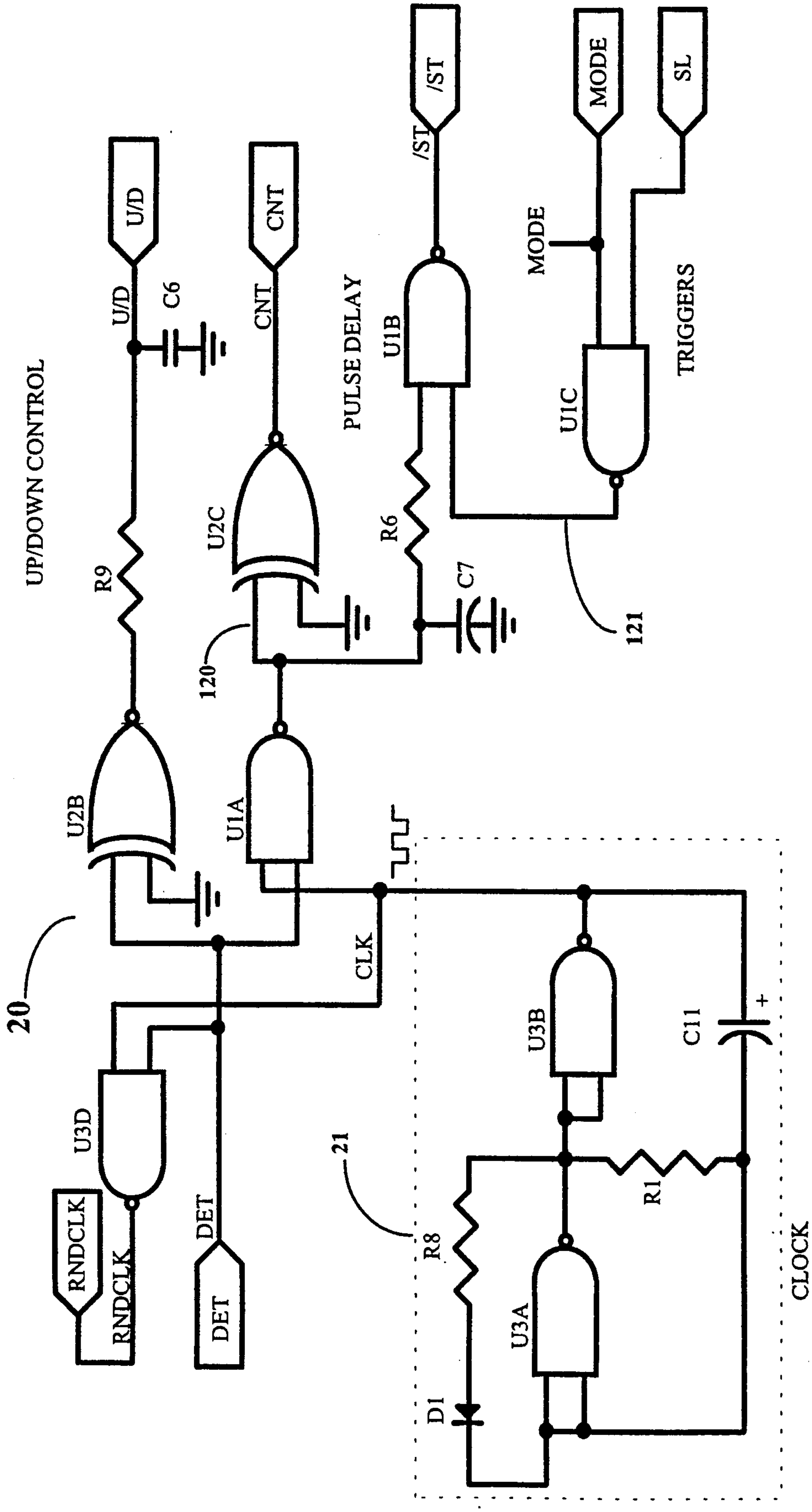

Referring now to FIG. 3, the clock and trigger circuitry 20 is described next. First, a clock circuit 21 comprises NAND gates U3A and U3B and associated feedback circuitry arranged to form an oscillator. The components are selected so that the oscillator has a frequency of about 1 Hz and the output signal CLK is almost always high. In other words, CLK has a duty ratio of about 95%. Accordingly, the CLK signal provides a brief low or negative pulse about once per second.

Second, the CLK signal and the DET signal are input to a NAND gate U3D. The output of gate U3D provides a signal called RNDCLK (random clock). Because both DET and CLK are active low, gate U3D acts as a logical OR gate so that RNDCLK is asserted (high) whenever either a CLK signal is received or a DET signal is received. Therefore, RNDCLK provides a high pulse at least about once per second, in response to the CLK signal, and additional pulses in response to each DET signal pulse. RNDCLK is used to clock the random counter, described below.

Third, the DET signal also is input to XNOR gate U2B which is wired as an inverter. The output of gate U2B provides a U/D (up/down) signal. Since DET is active low, and the signal is inverted, U/D goes high whenever motion is detected. Normally, i.e. in the absence of detected motion, U/D is low.

The DET and CLK signals also are input to another NAND gate U1A. U1A again acts as a logical OR, so that its output at node 120 provides a high pulse in response to a CLK signal pulse or a DET signal pulse. Node 120 is one of the input terminals to an XNOR gate U2C, also wired as an inverter. The output of gate U2C provides a CNT (count) signal. Therefore, CNT exhibits a low pulse in response to a CLK pulse or a DET pulse.

Node 120 also is coupled through a pulse delay circuit R6, C7 to another NAND gate U1B. The output terminal of gate U1B provides a signal /ST (speech trigger) which triggers speech synthesis circuitry described below, to activate a selected voice. Gate U1B acts as an enable circuit such that the speech trigger signal /ST is asserted (low) only when the other input to NAND U1B (node 121) is high.

Node 121 is a sound enable signal. Node 121 is coupled to the output terminal of a NAND gate U1C which combines a silent signal SL and a MODE signal further described below. Again using negative logic, when SL is low or MODE is low, node 121 is high and sound output is enabled. The two signals SL and MODE thus together form the proper conditions for silencing the sound effects.

Figure 4A:
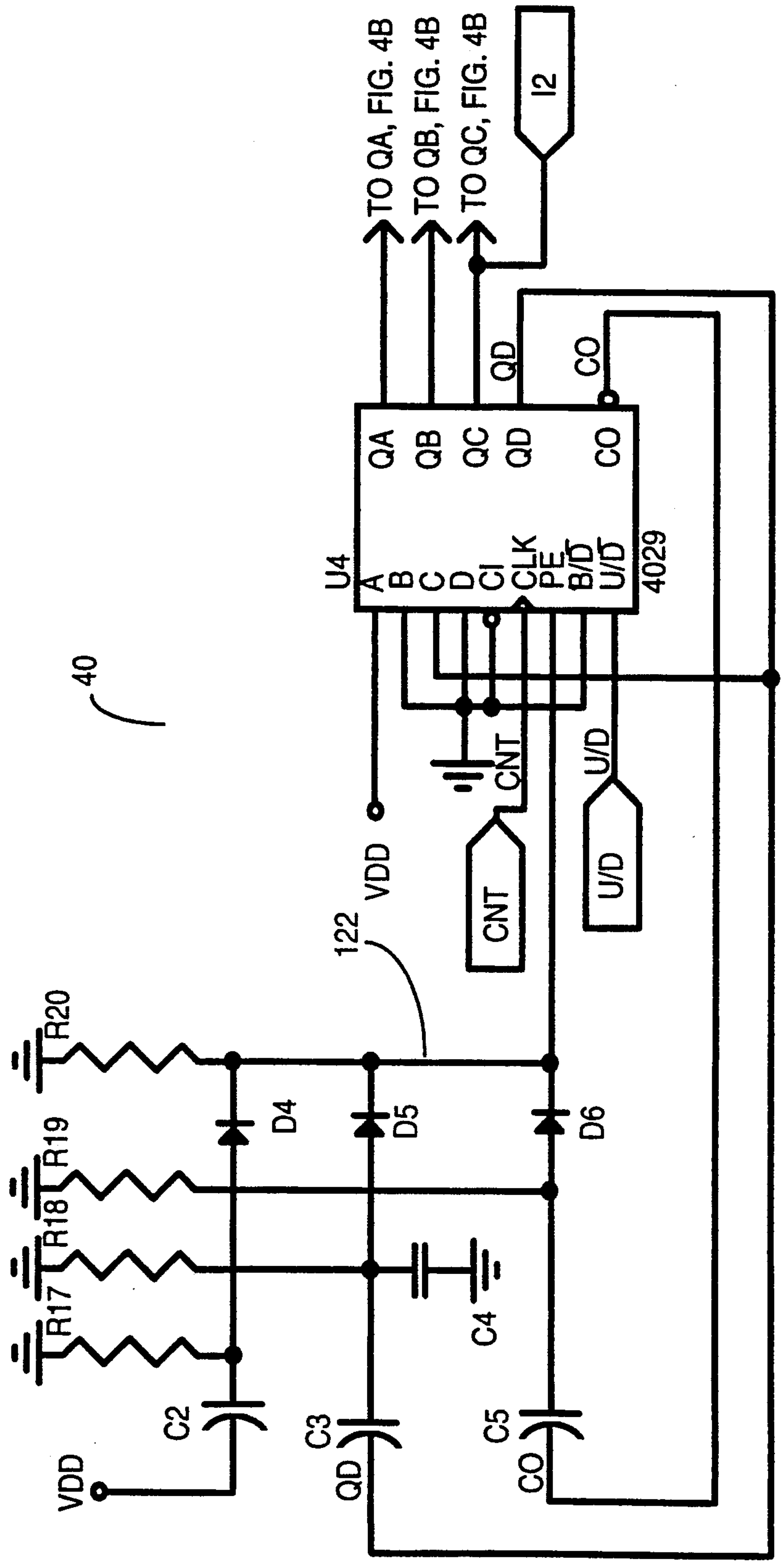
Figure 4B:
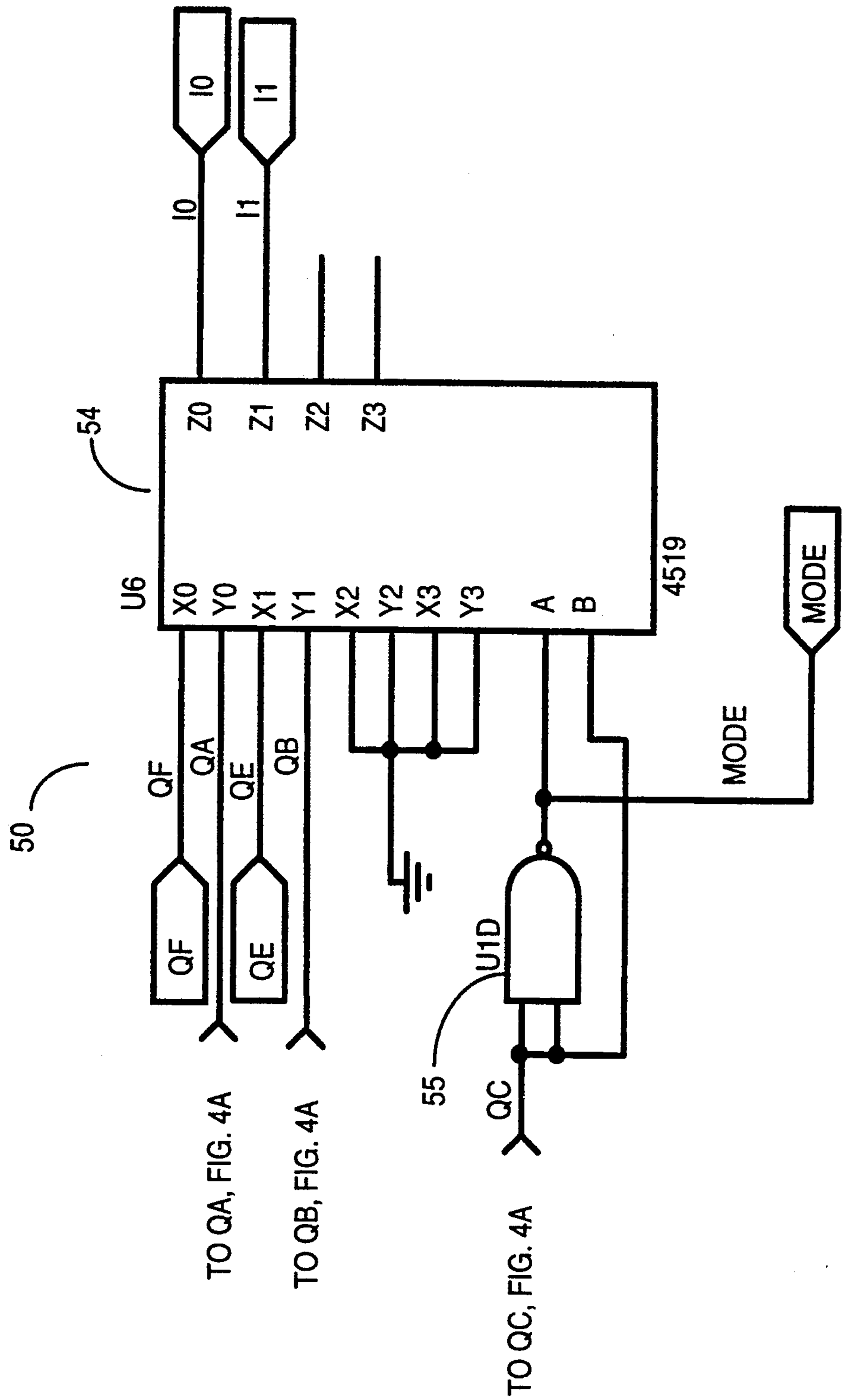

Turning now to FIG. 4, the motion counter and selection circuitry is described next. The motion counter 40 includes an integrated circuit counter U4, which is a CMOS counter part no. 4029. This is a four-bit up/-down binary counter with parallel load. In operation, when motion is detected, signal U/D is high so that the counter is in the UP mode. The CNT (count) signal is provided to the CLK input of the counter so that the counter increments in response to each CNT signal pulse. It may be recalled that CNT essentially represents the logical OR of the CLK signal and the motion DET signal. The motion count is presented at output terminals QA–QD.

When a motion has not been detected, DET is high so that U/D is low (see FIG. 3). This switches the counter U4 to the DOWN mode. In the DOWN mode, the counter U4 decrements in response to each CNT pulse at input terminal CLK. As long as motion is not detected, the CNT signal tracks the system clock signal. Accordingly, in the absence of detected motion, counter U4 counts down at about one count per second.

In down mode when the count is zero, the next count would be 1111 or binary 15. A count of 15, however, corresponds to the maximum state of excitement of the cows in the cattle car and would not be appropriate in this circumstance. For that reason, a counter overflow signal CO is coupled from the CO output terminal through capacitor C5 and diode D6 to a node 122 for resetting the counter, as follows.

Node 122 is coupled to the PE (parallel entry) terminal. A pulse on the PE terminal forces parallel load of data present at input terminals ABCD into the counter. Input A is coupled to VDD (Logical 1), and inputs B and D are coupled to ground (Logical 0). Input C is coupled to output QD which also will be at zero when the outputs are at zero. Accordingly, the number 0001 is loaded into the counter. The counter, therefore, loops back between 0 and 1 indefinitely, in the absence of a motion detect signal (until the timeout circuit disconnects the battery).

When motion is detected, U/D goes high, switching the counter into UP mode. In response to each CNT signal, the counter is incremented, up to a count of 0111, that is, binary 7. On the next count, the most significant output QD goes high. The QD output terminal is coupled through capacitor C3 and diode D5 to node 122. Another capacitor C4 helps to establish the necessary set-up and hold time so that the PE terminal (node 122) again is asserted to force a parallel load, instead of just incrementing the counter to the next number (1000).

This time, input C is at a logical 1 because it is tied to output QD. Accordingly, inputs ABCD provide a parallel load of the binary number 0101. For as long as additional motion is detected, the counter remains in UP counting mode, and loops between 7 and 5. In other words, the counter outputs provide a decimal equivalent sequence 5-6-7, 5-6-7. The looping among states, both at the low end, in the absence of detected motion, and at the high end, in the presence of repeated motion detections, has been found to be advantageous for providing interesting and realistic sound effects. This looping provides changing voice selection, even when the input conditions are static.

Finally, the motion counter circuitry 40 includes power on reset circuitry as follows. The regulated power supply voltage VDD is coupled through a capacitor C2, pull-up resistor R17 and diode D4 to the parallel forced entry terminal PE at node 122. Accordingly, at power-up, the PE input terminal is pulsed to load binary 0001 into the counter to begin operation.

Figure 5:
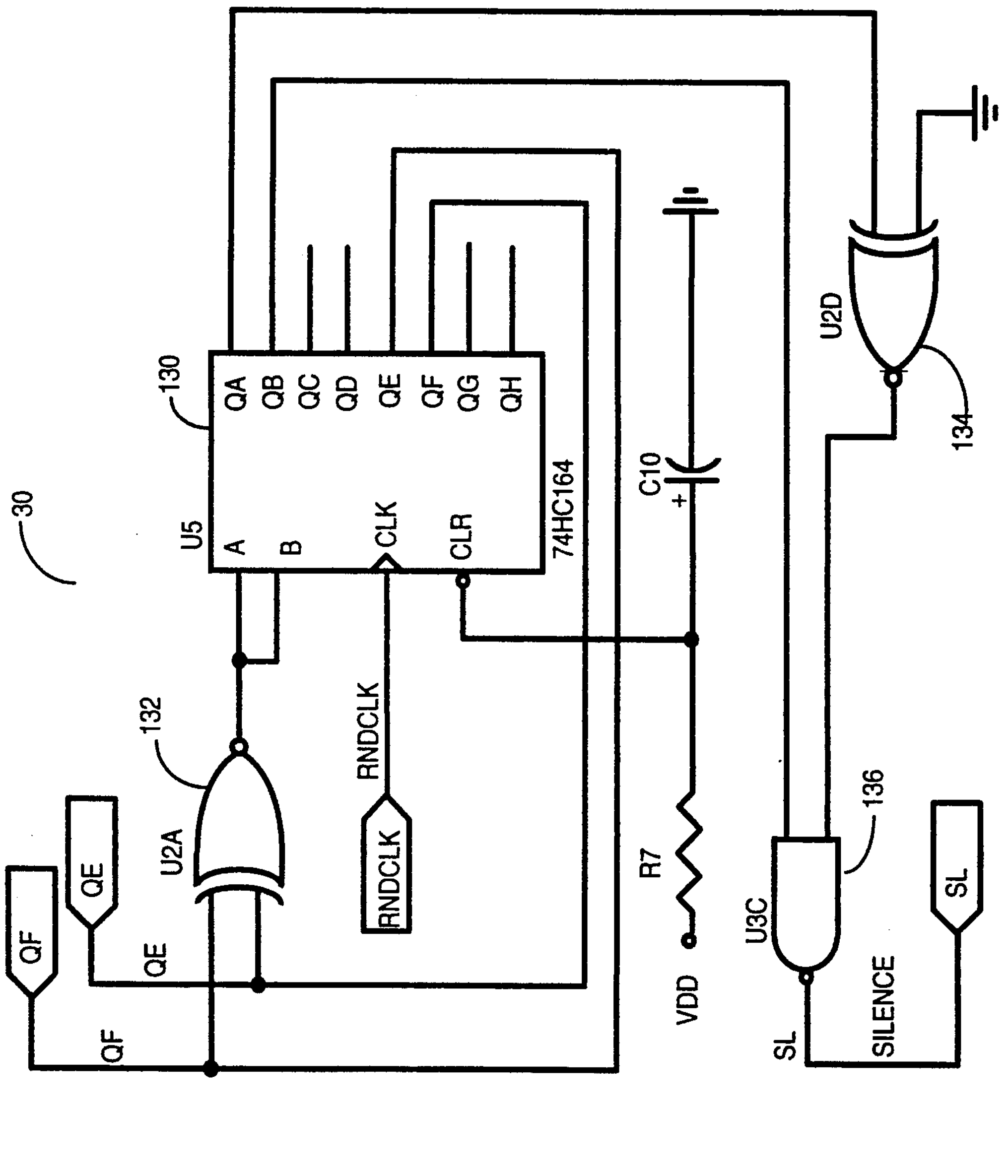

Before describing the selection circuitry 50, it is useful to examine the random counter circuitry 30 shown in FIG. 5. The heart of the random counter is an 8-bit parallel-out serial shift register, for example, Part No. 74HC164 available from National Semiconductor Corp., referred to herein as counter 130. Counter 130 is arranged as a state generating machine. It provides for silencing the sound synthesis circuitry at pseudo-random times, and provides pseudo-random selection of gentle cow voices in the random mode of operation.

Output terminals QE and QF are fed back through an XNOR gate 132 to input terminals A and B, the serial data input/enable terminals. Outputs QG and QH are not used. This six-bit counter thus provides for a predetermined sequence of 32 unique output states. This number of states is not critical, but 32 was found to be easy to implement and convenient for achieving the objects at hand. The clock input terminal to the counter 130 is coupled to receive the RNDCLK (random clock) signal so that the counter changes state responsive to each RNDCLK pulse.

Outputs QA and QB of counter 130 are coupled through gates 134, 136 to provide a silence signal SL. Silence signal SL is coupled through a gate 138 (FIG. 3) to silence the speech synthesizer, i.e., to disable sound, when SL is high. The counter outputs QA and QB are selected and logic 134, 136 arranged so that SL is high approximately one-fourth of the time. In other words, about one-fourth of the 32 possible output states will drive SL high. This circuitry thus provides for interspersing a good measure of silence among the cow voices. The frequency and duration of the silent periods, however, will depend on the clock frequency and upon the detected motion of the cattle car. This adds interest to the resulting sound effects in that, when cow voices will be heard is somewhat random. This unpredictability helps make the sound effects created by this invention fun and interesting. Other details of the circuitry of FIG. 5 will be apparent to those skilled in the art.

The circuitry of FIG. 5 is but one example of innumerable ways to implement the random counter. It is essentially a state machine which could conveniently be implemented with other types of logic, in a microprocessor, or in software.

Output terminals QE and QF of random counter 130 are connected to selection circuitry, described next. Referring again to FIG. 4, selection circuitry 50 comprises an integrated circuit 4-bit selector 54. The IC may be, for example, CMOS part no. 4519. Only the low-order two input bits X0,X1,Y0,Y1 are used. Input terminals X0,X1 are connected to receive output signals QE,QF from the random counter 130 (FIG. 5). Input terminals Y0,Y1 are connected to receive output signals QA,QB from the motion counter (U4). The selector 54 couples one of the X and Y input pairs at a time to the corresponding output terminals Z0,Z1 as determined by the states of control input signals A and B.

Motion counter 40 output QC is inverted in a NAND gate 55 to provide the A input signal to selector 54. NAND gate 55 also provides the MODE signal (QC inverted). The QC signal is connected directly as the B input signal. This arrangement ensures that, when QC is low, signals QE,QF from the random counter are coupled to selector 54 outputs Z0,Z1. Outputs Z0,Z1 provide voice selection bits I0,I1 for selecting cow voices. QC is coupled to the voice synthesis circuitry as voice selection bit I2. When QC is low, MODE is high, indicating random mode. This is a relaxed mode in which cow voices 000 through 011, gentle cow voices, are pseudo-randomly activated. This mode persists so long as the motion count (output of U4) is less than 4 (binary 100).

If and when the motion count reaches 4 (binary 100), QC goes high and accordingly MODE goes low. In response, the selector couples the QA,QB signals from the motion counter to the Z0,Z1 output terminals as voice selection bits I0, I1. This is the triggered mode, a higher state of excitation in which cow voices 100 through 111 are used. (I2 is a logical one because QC is now high.)

Figure 6A:
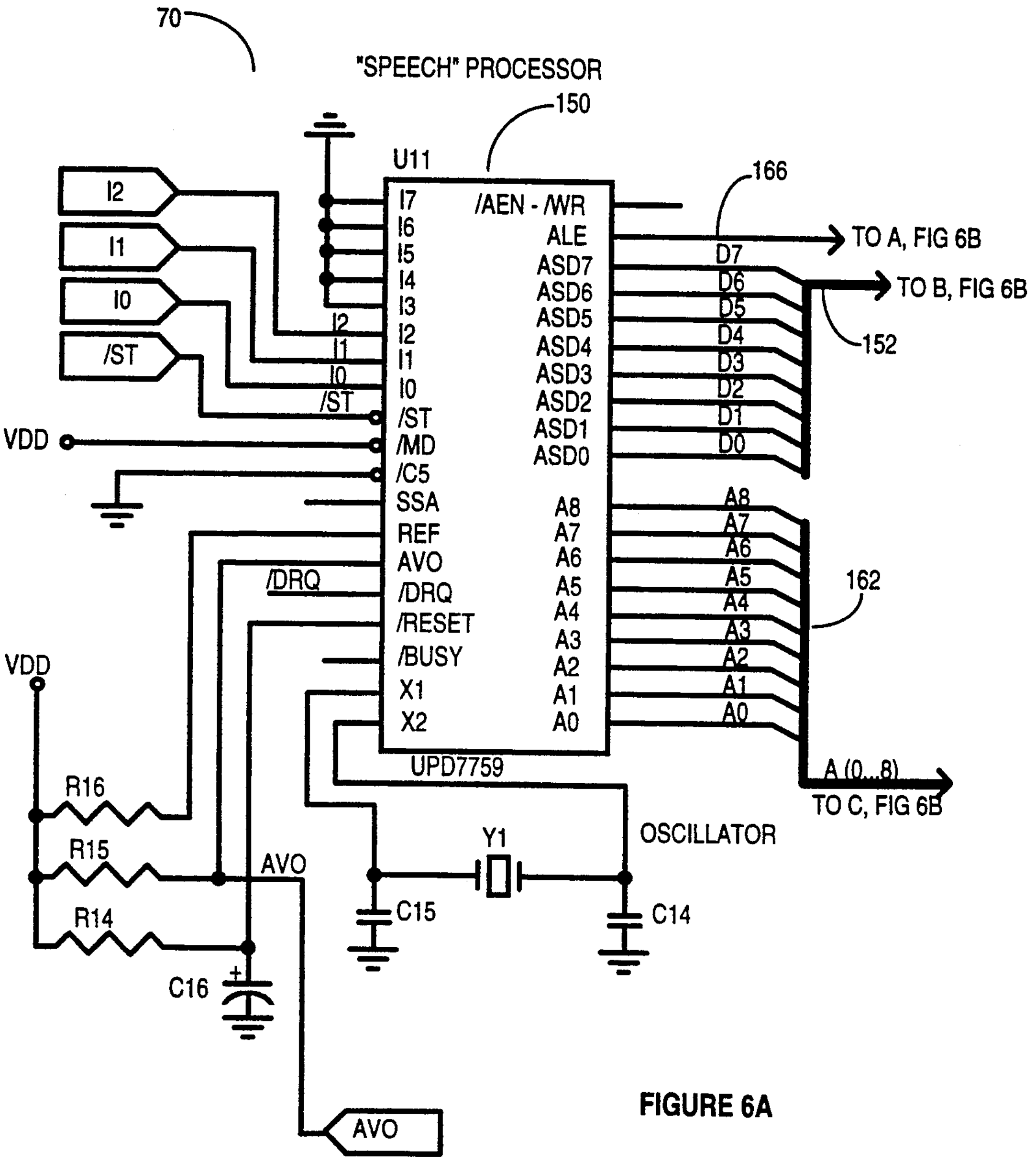
Figure 6B:
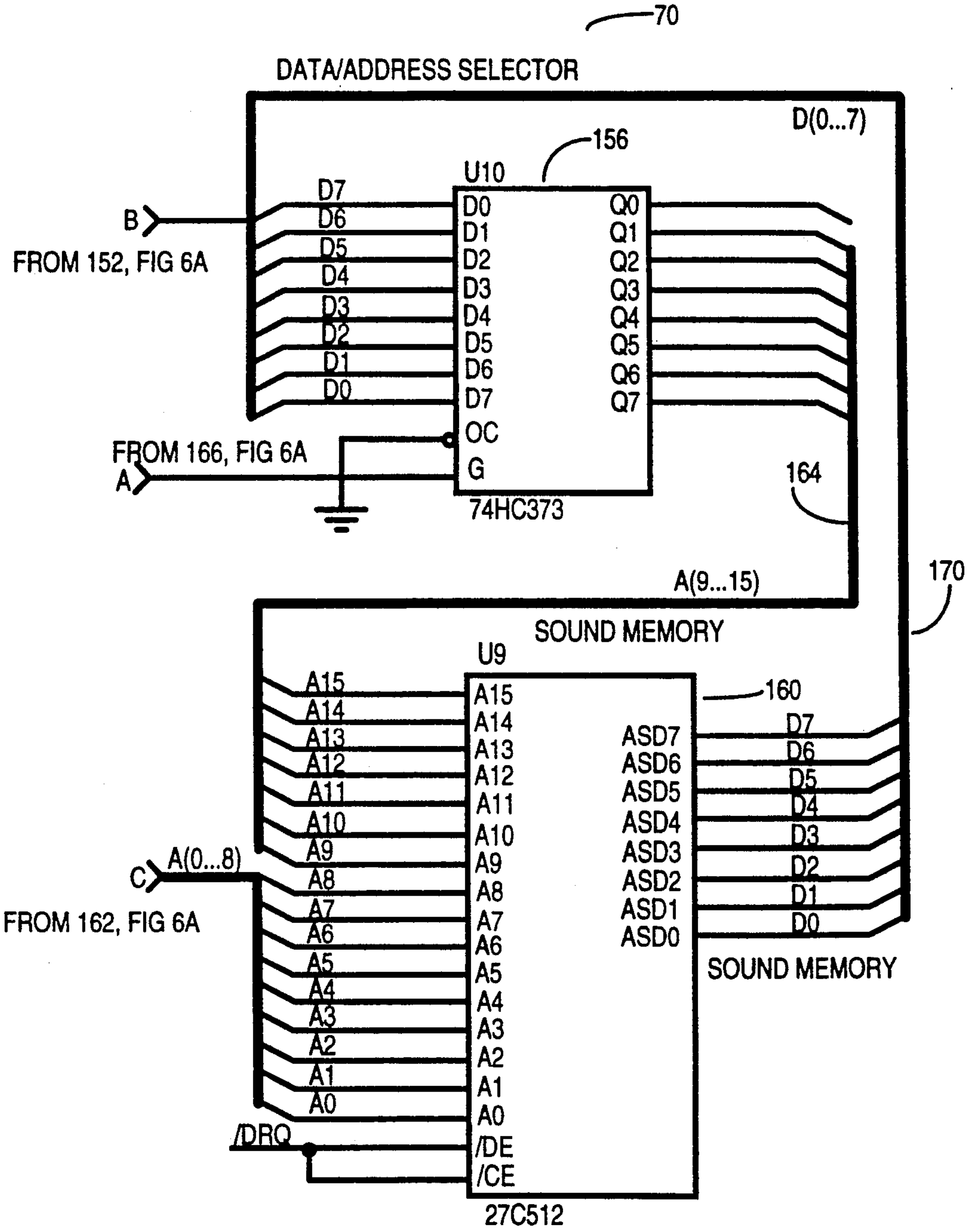

Referring now to FIG. 6, the speech synthesis circuitry 70 comprises an integrated circuit speech processor 150, for example, Part No. UPD7759 available from NEC Corporation. The speech processor 150 includes bidirectional terminals ASD0 through ASD7. These eight terminals are coupled over a BUS 152 to input terminals D0 through D7 of a latch 156.

Data for generating each of the cow voices (0–7) is stored in a read-only memory 160. Memory 160 may comprise, for example, an EPROM Part No. 27C512. To create the data, actual live cow voices are recorded to create analog data. The analog data is converted to digital data by conventional means, and the resulting digital data programmed into the EPROM. The A/D conversion may be done, for example, at a 6 KHz sample rate and 12 bits resolution.

Speech processor 150 includes low order address output terminals A0 through A8 which are coupled over a BUS 162 to the corresponding address input terminals to memory 160.

Output terminals Q1 through Q7 of latch 156 are coupled over a BUS 164 to provide the high order address bits A9 through A15 to the memory. The gate input terminal to latch 156 is controlled by the ALE (address latch enable) output of the speech processor 150 over path 166. Speech processor 150 thus provides 15 bits of address information. The low order nine bits are provided directly over BUS 162 to EPROM 160. The high order eight bits latched in latch 156, and then seven of them are provided over BUS 164 to EPROM 160. (The most significant address bit appearing at output Q0 of latch 156 is not used.) The selected voice data is provided at EPROM 160 output terminals ASD0 through ASD7 and along BUS 170 back to the speech processor 150.

The speech processor 150 is controlled as follows. Inputs I3 through I7 are not used. Inputs I0 through I2 are the voice selection bits for selecting one of seven predetermined voices. These voices are described in Table I as follows:

TABLE I

| | (QD) | I2 | I1 | I0 | |
|---|---|---|---|---|---|
| Random | 0 | 0 | 0 | 0 | Silence & Loop to 0001 |
| Random | 0 | 0 | 0 | 1 | Gentle Cow 1 |
| Random | 0 | 0 | 1 | 0 | Gentle Cow 2 |
| Random | 0 | 0 | 1 | 1 | Gentle Cow 3 |
| Triggered | 0 | 1 | 0 | 0 | 1 Excited Cow |
| Triggered | 0 | 1 | 0 | 1 | 2–3 Very Excited Cows |
| Triggered | 0 | 1 | 1 | 0 | 2–3 Completely Alarmed Cows |
| Triggered | 0 | 1 | 1 | 1 | 3–5 Crashing, Stampeding and Alarmed Cows |
| | 1 | 0 | 0 | 0 | Immediately Loop to 0101 |

TABLE I-continued

The /ST input terminal is coupled to receive the /ST signal for triggering the speech synthesis.

Referring back to FIG. 3, the speech trigger signal /ST is derived as follows. The CLK and DET signals are logically ORed in gate U1A, the output of which is node 120. The signal at node 120 passes through pulse delay R6,C7 into NAND gate U1B, the output of which provides /ST, normally high. /ST therefore is enabled by the other input to gate U1B, a sound enable signal. This sound enable signal is the output of another NAND gate U1C. Since negative logic is used, U1C provides a logical OR of signals SL and MODE. SL is low during certain states of the random counter, so sound is disabled at pseudo-random times, during random mode of operation (MODE signal high). Sound is always enabled in triggered mode (MODE signal low).

Figure 7:
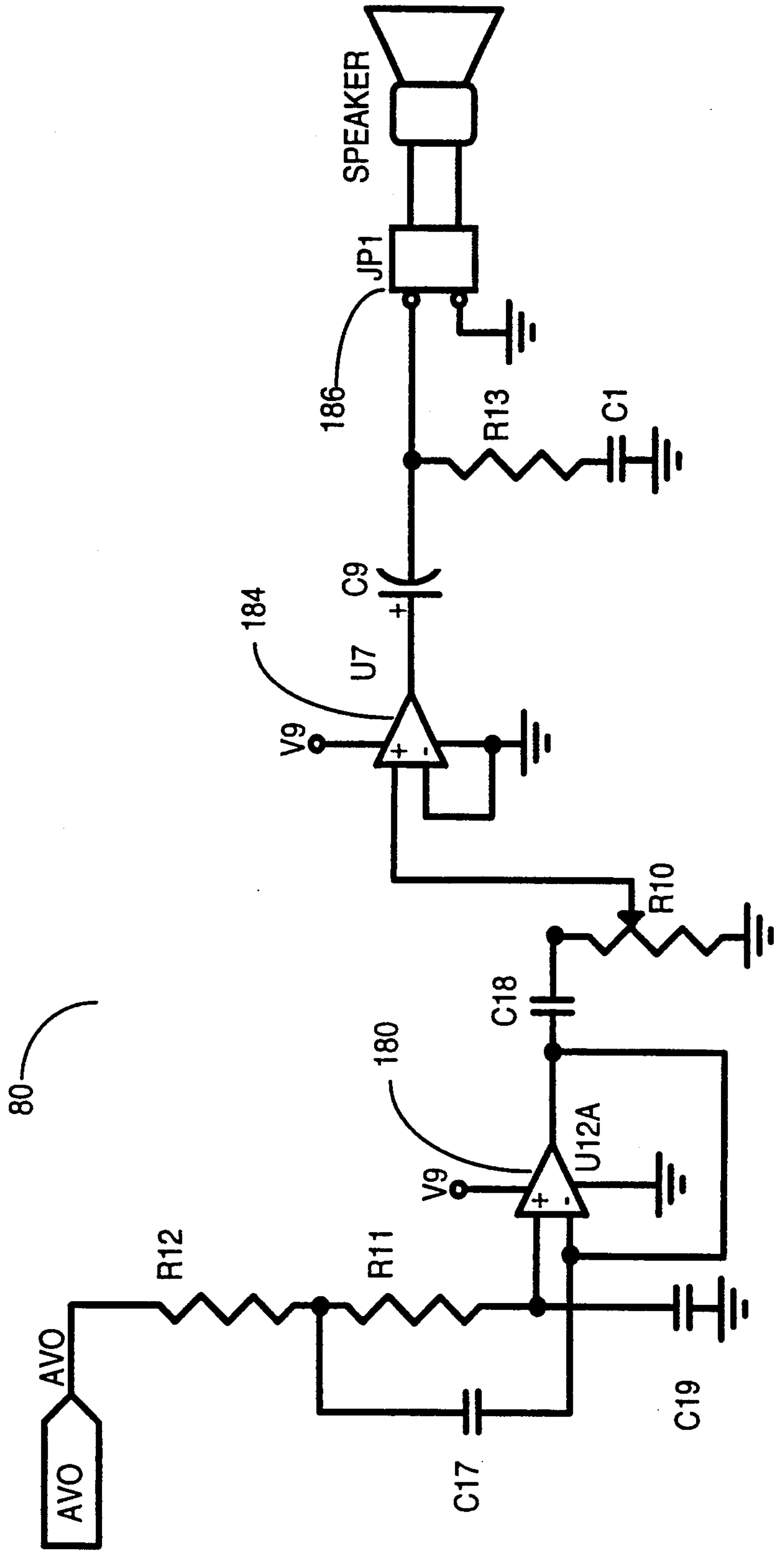

Referring now to FIG. 7, audio output circuitry 80 is shown. The audio output signal AVO from speech processor 150 (FIG. 6) is coupled to an amplifier 180 arranged as a low pass filter to reduce noise. The output of amplifier 180 is AC coupled through a potentiometer R10 to an audio power amplifier 184. The output of the audio amplifier is AC coupled to a header 186 for connection to a speaker. The audio output circuitry 80 serves to filter and amplify the audio output signal from the speech processor for driving the speaker. Other details of the circuitry of FIG. 7, as well as variations on this circuitry, will be apparent to those skilled in the art.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A sound effect system for use in a toy comprising:
   - clock means (21) for providing a system clock signal (CLK);
   - a pseudo-random counter (30) coupled to the clock means for providing a random count, so that the random count changes in response to each cycle of the system clock signal;
   - sound generating means (FIG. 6) for generating a selected one at a time of a plurality of predetermined audible voices, each one of said voices corresponding to a respective voice selection number (I0–I2); and
   - means (50) for interconnecting the pseudo-random counter and the sound generating means for providing the random count to the sound generating means as the voice selection number so that the voice selection changes in response to each cycle of the system clock signal, thereby changing the voice selection in a random sequence over time without external stimulus.

2. A sound effect system according to claim 1 wherein the sound generating means includes:
   - memory means (160) for storing digital data representing each of the voices; and speech synthesis means (150) coupled to the memory means to receive the stored data for synthesizing the selected voice in accordance with the stored data.

3. A sound effect system according to claim 1 including:

motion detecting means for detecting a motion and for providing a motion detect signal; and means for clocking the pseudo-random counter to change the random count responsive to the motion detect signal.

4. A sound effect system comprising:

clock means for providing a system clock signal (CLK);

a pseudo-random counter coupled to the clock means for providing a random count, so that the random count changes in response to each cycle of the system clock signal;

sound generating means for generating a selected one at a time of a plurality of predetermined audible voices, each one of said voices corresponding to a respective voice selection number (I0–I2);

means (50) for interconnecting the pseudo-random counter and the sound generating means for providing the random count to the sound generating means as the voice selection number so that the voice selection changes in response to each cycle of the system clock signal, thereby changing the voice selection in a random sequence over the time without external stimulus;

means (100) for powering the system;

detecting means (104) responsive to a predetermined stimulus for providing a stimulus detect signal (DET); and means (107) responsive to the stimulus detect signal for automatically connecting the powering means to the system to start operation of the system in response to the stimulus.

5. A sound effect system according to claim 2 wherein the stimulus is lateral motion and the stimulus detect signal is a motion detect signal.

6. A sound effect system for use in a toy comprising:

clock means (21) for providing a system clock signal (CLK);

a pseudo-random counter (30) coupled to the clock means for providing a random count, so that the random count changes in response to each cycle of the system clock signal;

sound generating means (FIG. 6) for generating a selected one at a time of a plurality of predetermined audible voices, each one of said voices corresponding to a respective voice selection number (I0–I2);

means (50) for interconnecting the pseudo-random counter and the sound generating means for providing the random count to the sound generating means as the voice selection number so that the voice selection changes in response to each cycle of the system clock signal, thereby changing the voice selection in a random sequence over time without external stimulus;

means (100) for powering the system;

detecting means (104) responsive to a predetermined stimulus for providing a stimulus detect signal (DET);

means (107) responsive to the stimulus detect signal for automatically connecting the powering means to the system to start operation of the system in response to the stimulus;

timing means (R2,C8) for providing a predetermined time interval, coupled to the detecting means so that the time interval starts in response to the stimulus detect signal; and means (107) responsive to a conclusion of the time interval for disconnecting the powering means from the system to stop operation of the system.

7. A sound effect system according to claim 6 wherein the timing means includes reset means to restart the time interval responsive to a new stimulus detect signal during the time interval, so that the powering means remains connected to the system at least so long as a new stimulus detect signal occurs before a conclusion of each time interval.

8. A sound effect system for use in a toy comprising:

clock means (21) for providing a system clock signal (CLK);

state generating means (30) coupled to the clock means for providing a random count, the random count changing in response to each cycle of the system clock signal; and sound generating means (FIG. 6) for generating a selected one of a plurality of predetermined audible voices, each one of said voices corresponding to a respective voice selection number (I0-I2), coupled to receive the random count as the voice selection number so that the selected voice changes in response to the system clock signal, thereby generating voices in a random sequence;

wherein one of the voices is silence for interleaving periods of silence among the selected voices generates by the sound generating means.

9. A sound effect system for use in a toy, comprising:

clock means (21) for providing a system clock signal (CLK);

a pseudo-random counter (30) coupled to the clock means for providing a random count, so that the random count changes in response to each cycle of the system clock signal;

sound generating means (FIG. 6.) for generating a selected one at a time of a plurality of predetermined audible voices, each one of said voices corresponding to a respective voice selection number (I0–I2);

means (50) for interconnecting the pseudo-random counter and the sound generating means for providing the random count to the sound generating means as the voice selection number so that the voice selection changes in response to each cycle of the system clock signal, thereby changing the voice selection in a random sequence over time without external stimulus;

means (134,136) coupled to the pseudo-random counter for detecting and indicating a predetermined count; and means responsive to the indication of the predetermined count (SL,U1C) for silencing the sound generating means, thereby silencing the sound generating means at random.

10. A sound effect system for use in a toy comprising:

clock means (21) for providing a system clock signal (CLK);

a pseudo-random counter (30) coupled to the clock means for providing a random count, so that the random count changes in response to each cycle of the system clock signal;

sound generating means (FIG. 6) for generating a selected one at a time of a plurality of predetermined audible voices, each one of said voices corresponding to a respective voice selection number (I0–I2); and motion detecting means for detecting a motion and for providing a motion detect signal;

means (RNDCLK) for clocking the pseudo-random counter to change the random count responsive to both the system clock signal and the motion detect signal;

means for interconnecting the pseudo-random counter and the sound generating means for providing the random count to the sound generating means as the voice selection number so that the system changes selected voices responsive to each cycle of the system clock signal and further changes selected voices responsive to each detected motion.

11. A sound effect system for use in a toy comprising:

clock means for providing a system clock signal;

a pseudo-random counter coupled to the clock means for providing a random count, so that the random count changes in response to each cycle of the system clock signal;

sound generating means for generating a selected one at a time of a plurality of predetermined audible voices, each one of said voices corresponding to a respective voice selection number;

means for interconnecting the pseudo-random counter and the sound generating means for providing the random count to the sound generating means as the voice selection number so that the voice selection changes in response to each cycle of the system clock signal, thereby changing the voice selection in a random sequence over time without external stimulus;

motion detecting means for detecting a motion and for providing a motion detect signal;

means for clocking the pseudo-random counter to change the random count responsive to the motion detect signal;

a detect counter coupled to the motion detecting means for generating a detect count indicating a state of excitation of the system;

means for incrementing the detect counter responsive to the motion detect signal; and means for decrementing the detect counter responsive to the system clock signal so that the detect count gradually increases responsive to repeated motion detect signals and gradually decreases in the absence of detect signals.

12. A sound effect system according to claim 11 including:

means for resetting the detect counter to a predetermined first count responsive to the detect count reaching a predetermined minimum count, so that the detect counter loops between the first count and the minimum count responsive to continued decrementing whereby the voice selection varies over time even absent the external stimulus.

13. A sound effect system according to claim 11 including:

means for resetting the detect counter to a predetermined count responsive to the detect count reaching a predetermined maximum count, so that the detect counter means loops between the count and the maximum count responsive to continued incrementing.

14. A sound effect system according to claim 11 wherein the detect counter includes a parallel load up/-down integrated circuit counter (U4).

15. A sound effect system according to claim 11 further comprising mode indicating means (U1D) coupled to the detect counter (U4) for indicating a random mode when the detect count is less than a predetermined trigger count and for indicating a triggered mode when the detect count is equal to or greater than the trigger count;

the mode indicating means being coupled to the sound generating means for controlling the sound generating means to select among a first set of voices when random mode is indicated and to select among a second set of voices when trigger mode is indicated.

16. A sound effect system according to claim 15 further comprising selecting means (50) interconnecting the state generating means, the counter means and the sound generating means, for coupling the random count to the sound generating means as the voice selection number when random mode is indicated and for coupling the detect count to the sound generating means as the voice selection number when triggered mode is indicated.

17. A sound effect system for use in a toy comprising:

system clock means (21) for providing a system clock signal (CLK);

state generating means (30) coupled to the clock means for providing a random count, the random count changing in response to each cycle of the system clock signal;

sound generating means (FIG. 6) for generating a selected one of a plurality of predetermined audible voices, each one of said voices corresponding to a respective voice selection number (I0–I2), coupled to receive the random count as the voice selection number so that the selected voice changes in response to changes in the random count, thereby generating voices in a random sequence;

a lateral motion detector for detecting lateral motion and for providing a detect signal indicating an occurrence of lateral motion;

means responsive to the detect signal for clocking the state generating means to change the random count;

the lateral motion detector including a normally-open switch having first and second terminals, including:

an elongate electrically conductive pendulum having top and bottom ends, the top end electrically coupled to the first terminal and;

a generally horizontal plate having an aperture extending therethrough sized to clear the pendulum and including conductive means extending about the periphery of the aperture and coupled to the second terminal for contacting the pendulum;

the pendulum being suspended by the top end over the plate, aligned over and extending through the aperture so as to clear the aperture at rest and so that, responsive to lateral motion of the top end of the pendulum, the pendulum swings so as to come into contact with the conductive means, thereby electrically interconnecting the first and second terminals so as to couple the detect signal through the switch to the clocking means for clocking the state generating means to change the random count responsive to the lateral motion.

18. In a movable toy having a sound generating apparatus for generating a selected one of a predetermined set of voices, a method of selecting among the voices responsive to both lateral motion and time, the method comprising:

providing a periodic binary clock signal;

providing a counter in the toy for maintaining a detect count;

monitoring the toy to detect a lateral motion;

indicating each detection of a lateral motion;

incrementing the detect count responsive to each indication of a lateral motion;

decrementing the detect count responsive to each cycle of the clock signal; and providing the detect count to the sound generating apparatus for selecting among the voices in accordance with the detect count, so that the selected voice changes to reflect the number and frequency of previously detected lateral motions, and further changes over time absent lateral motion.

19. A sound effect system for use in a model railroad car comprising:

clock means (21) for providing a periodic system clock signal (CLK);

a pseudo-random counter (30) for providing a random count (QE,QF);

a motion detector for providing a motion detect signal responsive to lateral motion of the car;

means for clocking the pseudo-random counter to change state responsive both to the system clock signal and to the detect signal; and sound generating means (70,80) for generating a selected one of a plurality of predetermined audible voices, each one of said voices corresponding to a respective voice selection number (I0–I1), the sound generating means being coupled to receive the random count as the voice selection number so that the voice selection changes in a random sequence, responsive to each cycle of the system clock signal and responsive to each motion detect signal, whereby both the timing and the sequence of the selected voices is unpredictable in use.

20. A sound effect system according to claim 19 further comprising:

a motion counter (40) for providing a motion count;

means for incrementing the motion counter responsive to each motion detect signal;

means for decrementing the motion counter responsive to the system clock signal, so that the motion count gradually increases responsive to a series of motion detect signals occurring more frequently than the system clock frequency, and the motion count gradually decreases otherwise;

means for coupling the motion count to the sound generating means as the voice selection number when the motion count is at least equal to a predetermined minimum value defining a triggered mode of operation, so that the voice selection is responsive to the motion count during triggered mode; and means for coupling the random count to the sound generating means as the voice selection number when the motion count is less than the predetermined minimum value, defining a random mode of operation, so that the voices are selected pseudo-randomly during random mode.

21. A sound effect system according to claim 20 further comprising:

means for resetting the motion counter to a predetermined first count responsive to the motion count reaching a predetermined minimum count, so that the motion counter means loops between the first count and the minimum count responsive to continued decrementing, whereby the voice selection automatically varies over time even absent lateral motion.

22. A sound effect system for use in a model railroad car comprising:

clock means for providing a periodic system clock signal;

a pseudo-random counter for providing a random count;

a motion detector for providing a motion detect signal responsive to lateral motion of the car;

means for clocking the pseudo-random counter to change state responsive both to the system clock signal and to the detect signal;

sound generating means for generating a selected one of a plurality of predetermined audible voices, each one of said voices corresponding to a respective voice selection number, the sound generating means being coupled to receive the random count as the voice selection number so that the voice selection changes in a random sequence, responsive to each cycle of the system clock signal and responsive to each motion detect signal, whereby both the timing and the sequence of the selected voices is unpredictable in use;

means coupled to a pseudo-random counter for detecting and indicating a predetermined count; and means responsive to the indication of the predetermined count for silencing the sound generating means, thereby silencing the sound generating means at random.

23. A sound effect system for a model railroad car comprising:

a random counter for providing a random sequence of voice selection numbers;

a lateral motion detector for providing an indication responsive to a lateral motion of the car;

means for clocking the random counter so as to provide a different one of the voice selection numbers in response to each indication of a lateral motion of the car; and sound generating means for playing a selected one at a time of a plurality of predetermined audible voices, each one of said voices corresponding to a respective one of the voice selection numbers, the sound generating means being coupled to the random counter to receive the voice selection number so that, in use, a new one of the voices is randomly selected in response to each indication of a lateral motion of the car.

* * * * *

UNITED STATES PATENT AND TRADEMARK OFFICE

CERTIFICATE OF CORRECTION

PATENT NO. : 5,267,318
DATED : November 30, 1993
INVENTOR(S) : Severson et al.

It is certified that error appears in the above-indentified patent and that said Letters Patent is hereby corrected as shown below:

Column 11, claim 4, line 29, change "over the time" to --over time--;

Column 11, claim 5, line 39, change "claim 2" to --claim 4--;

Column 15, claim 19, line 38, change "(I0-I1)" to --"(I0-I2)".

Signed and Sealed this

Tenth Day of June, 1997

*Attest:*

BRUCE LEHMAN

*Attesting Officer*

*Commissioner of Patents and Trademarks*